T. G. RENNERFELT.
BALL BEARING.
APPLICATION FILED DEC. 26, 1911.
1,099,571.
Patented June 9, 1914.
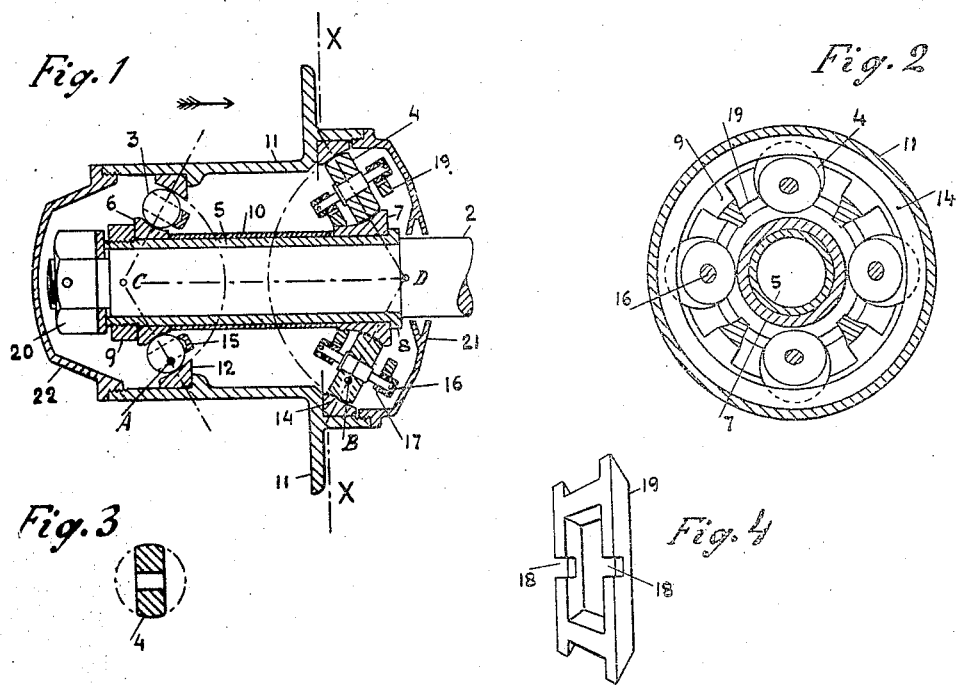
INVENTOR
Ture Gustaf Rennerfelt
WITNESSES:

UNITED STATES PATENT OFFICE.

TURE GUSTAF RENNERFELT, OF STOCKHOLM, SWEDEN.

BALL-BEARING.

1,099,571. Specification of Letters Patent. Patented June 9, 1914.

Application filed December 26, 1911. Serial No. 667,823.

*To all whom it may concern:*

Be it known that I, TURE GUSTAF RENNERFELT, a subject of the King of Sweden, and a resident of Stockholm, in the Kingdom of Sweden, have invented certain new and useful Improvements in Ball-Bearings, of which the following is a specification.

This invention relates to improvements in ball bearings, and it has for its objects to increase the efficiency and reliability of such bearings, and to so arrange them that any one ball utilized therein shall be able to sustain both lateral and axial pressure and shall not become jammed or be subjected to abnormally high pressure.

Other objects are to accomplish such a bearing which may be cheaply constructed and readily applicable to various purposes.

My invention is illustrated in the accompanying drawings in which—

Figure 1 is a longitudinal sectional view of a bearing applicable for instance to the hub of a wheel rotatably mounted on a shaft, as a loose pulley or a wheel for an automobile. Fig. 2 is a cross sectional view taken through Fig. 1 on the line X—X, and as seen looking thereat in the direction of the arrow. Fig. 3 is a cross sectional view of a detail called a mutilated ball or spherical roller. Fig. 4 is a side view of a detail called a yoke.

Referring to the drawings in detail, the shaft is represented by 2, and 3, 4 represent balls or bodies of rotation having spherical rolling faces. A sleeve 5 together with the inner race rings 6 and 7 mounted thereon constitute the inner track, the rolling faces of the race rings being formed concave, the center of curvature of said faces being shown at A and B respectively. A shoulder 8 at one end of the sleeve, and a nut 9 at its other end serve to keep the race rings in their proper position. A second sleeve 10 of proper length is interposed between the races to prevent the possibility of too great pressure being brought upon the balls by undue tightening of the nut. A frame or casing 11 of cast material, for instance malleable iron, together with the outer race rings 12 and 14 constitute the outer track of the bearing. The rolling faces of the race rings 12 and 14 are spherical, and are located obliquely relatively to each other and relatively to the inner race rings, their center being located at C and D respectively. All the races preferably consist of hardened steel rings, the surface which fits on sleeve or in casing being cylindrical, and the rolling surfaces accurately ground to the shape described.

The spherical rollers 3 are shown as complete balls, kept apart by a ball retainer or yoke 15. The spherical rollers 4 are shown as mutilated balls or middle sections of spheres mounted with their axes at an acute angle with the shaft. They are indicated as of much greater diameter than the balls 3, so that they are able to sustain the greater pressure, to which they may be subjected during the operation of the bearing. A stud 16 passes through the center of each roller, and the ends of the studs are journaled in bearing blocks 17, which are slidingly supported in slots 18 milled in radial direction in the yoke 19 to such depth that the studs are not exposed to pressure radially. The yoke 19 is independent of the yoke 15. It is mounted in the bearing concentrically with the shaft, and serves to keep the rollers in proper position with the axis of a roller in the same plane as the center line of the shaft. As shown on the drawing it is similar to the yoke described in my pending application for U. S. Patent Serial No. 626557.

20 represents a nut threaded upon the end of the shaft and serving to clamp the inner track to the shaft.

21 represents a dustguard, and 22 a cap closing the end of the bearing. The running faces of the race rings 12 and 14 are shown as oblique spherical zones, the diameter at one end being greater than at the other end, and their greatest diameter being smaller than the diameter of the sphere.

In the operation of the bearing any bending moment, or any lateral or axial pressure on the bearing will be resisted by the balls, the pressures upon which will be directed along lines A—C and B—D, which form acute angles with the center line of the shaft. The balls will assume such a position in the bearing that their centers will lie on the straight lines A—C or B—D. The line C—D will be the center line of the bearing around which the balls and also the casing will revolve, and the balls will move in circles upon the spherical surface even though the short ring upon which this face is ground be placed eccentrically or obliquely in the casing, which will frequently occur in practice. This would not be the case if the face of the race had any other shape than spherical, and the balls would then become jammed and be subjected to abnormally high pressure.

For light service, for instance bicycle wheels and light loose pulleys, I prefer to use complete balls in the bearing instead of the mutilated balls 4; for very heavy service I prefer the mutilated balls, four in number, and of liberal dimensions. In some cases I prefer to form the spherical races integrally with the casing, made of cast iron with the races chilled, thus obtaining the races sufficiently hard and free from blowholes. It will thus be seen that the structure now disclosed causes the pressures on the different rollers in the same row to intersect in the axis of the bearing; that all the rollers in the same row travel at the same speed and roll in the same circle, so that a uniform pressure upon the rollers or balls is obtained, and that no matter how the cylindrical outer surfaces of the outer rings may be fitted to the casing the pressure on any and all the balls will still be directed to the points C or D on the center line of the bearing.

It is obvious that those skilled in the art may vary the details of construction as well as the arrangement of parts without departing from the spirit of my invention, and therefore I do not wish to be limited to the above disclosure except as may be required by the claims.

What I claim is:

1. In a ball bearing for a shaft the combination of two outer race rings having obliquely disposed spherical bearing surfaces whose centers are located on the center line of the bearing; two inner race rings having obliquely disposed concave bearing surfaces whose centers are located outside of said shaft; a series of spherical rollers located between the bearing surfaces of one pair of said inner and outer rings with their centers closer to the center line of said bearing than the center of the bearing surface of the corresponding inner ring; and a second series of rollers located between the second pair of inner and outer bearing surfaces; the centers of the said spherical bearing surfaces being located farther apart than the distance between the two series of rollers, substantially as described.

2. In a ball-bearing the combination of a shaft; an outer race ring having a spherical bearing surface obliquely disposed toward said shaft; an inner race ring having a concave bearing surface also obliquely disposed toward said shaft; the center of said first mentioned surface being located on the center line of said bearing; and the center of said second named surface being located outside of said shaft; a plurality of rollers having spherical bearing surfaces located between said spherical and concave surfaces with their centers located between said first named centers; studs on which said rollers are mounted; means for maintaining said studs in such positions that their axes intersect the center line of said bearing; a second outer race ring of a diameter different from said first named outer race ring; a second inner race ring associated with said second outer race ring; and a second set of rollers associated with said second mentioned outer and inner race rings substantially as described.

3. In a ball bearing adapted to surround a shaft, the combination of a casing, a plurality of race rings of unequal diameter fitting said casing and provided with obliquely disposed spherical bearing surfaces whose centers are located on the center line of the bearing; a plurality of inner race rings having concave bearing surfaces; a plurality of sets of rollers located between said inner and outer rings; the distance between the centers of said spherical surfaces being greater than the distance between the centers of their co-acting rollers; and means for holding said inner rings in position, substantially as described.

4. In a ball bearing the combination of a plurality of outer race rings having spherical bearing surfaces whose centers are located on the center line of the bearing; a plurality of inner race rings having concave bearing surfaces; spherical rollers located between said inner and outer bearing surfaces; the centers of said spherical surfaces being located a greater distance apart than are the centers of the corresponding rollers; means for holding said inner and outer rings in position; and means for holding said rollers in position, substantially as described.

5. In a ball bearing the combination of a shaft; an outer race ring having a spherical bearing surface whose center is located on the center line of said bearing; an inner race ring having a concave bearing surface whose center is located outside said shaft; a plurality of rollers having spherical surfaces located between said bearing surfaces, the centers of said rollers being located between the centers of said bearing surfaces; means for holding said spherical surfaces in position; means for holding said concave surfaces in position; means for holding said rollers in position, a second outer race ring of a diameter different from said first named outer race ring; a second inner race ring; and a second set of rollers associated with said second outer and inner race rings, substantially as described.

Signed at Stockholm, in the county of Stockholm, and Kingdom of Sweden, this eighth day of December A. D. 1911.

TURE GUSTAF RENNERFELT.

Witnesses:
 MELA PRISU,
 A. THANDERS.